United States Patent [19]

Schwenda et al.

[11] Patent Number: 4,522,463
[45] Date of Patent: Jun. 11, 1985

[54] DEVICE FOR RELEASABLY CONNECTING OPTICAL WAVEGUIDE FIBERS

[75] Inventors: Gerhard Schwenda, Grosshabersdorf; Alfred Orendt, Nuremberg, both of Fed. Rep. of Germany

[73] Assignee: Schiederwerk Gunter Schmidt KG Fabrik für Apparate der Fernmelde- und Elektrotechnik, Nuremberg, Fed. Rep. of Germany

[21] Appl. No.: 455,543

[22] Filed: Jan. 4, 1983

[30] Foreign Application Priority Data

Jan. 16, 1982 [DE] Fed. Rep. of Germany ....... 3201240

[51] Int. Cl.³ .............................................. G02B 7/26
[52] U.S. Cl. ................................................ 350/96.21
[58] Field of Search ................ 350/96.20, 96.21, 96.22

[56] References Cited

U.S. PATENT DOCUMENTS

| 3,885,859 | 5/1975 | Dalgleish et al. | 350/96.21 |
| 4,113,346 | 9/1978 | Jackson et al. | 350/96.20 |
| 4,116,532 | 9/1978 | Hubbard et al. | 350/96.21 |
| 4,279,467 | 7/1981 | Borsuk et al. | 350/96.21 |
| 4,281,892 | 8/1981 | Sitabkhan | 350/96.21 |
| 4,337,995 | 7/1982 | Tanaka et al. | 350/96.20 |
| 4,478,485 | 10/1984 | Khoe et al. | 350/96.20 |

FOREIGN PATENT DOCUMENTS 2363986 7/1975 Fed. Rep. of Germany ... 350/96.21

Primary Examiner—William L. Sikes
Assistant Examiner—Frank González
Attorney, Agent, or Firm—Holman & Stern

[57] ABSTRACT

Alignment device for connecting optical waveguide fibers wherein the ends of the fibers are inserted in a V-shaped groove in the device and clamped in place. The object of the invention is to produce a proper connection of the fiber ends, by technically simple and economical means, the correctness of which connection can be observed visually at any time, i.e. during and particularly after the formation of the connection. The path along which the fiber ends are moved when they are inserted into the V-shaped groove is perpendicular to the direction in which the fibers and groove are orientated, the vertex angle of the groove is orientated laterally in such a way that its bisector runs approximately horizontally, the depth of the groove is less than the diameter of the fiber end, so that when the fiber end is held in place it extends out to the side, out of the groove, and can be observed, there are two holding elements associated with each fiber end, one adjacent the end face of the fiber, and the other farther back away from the fiber end, and the holding elements associated with a fiber end are acted upon by at least one actuating member.

9 Claims, 4 Drawing Figures

DEVICE FOR RELEASABLY CONNECTING OPTICAL WAVEGUIDE FIBERS

BACKGROUND OF THE INVENTION

1. Field of the Invention

The invention relates to a device for releasably connecting the ends of optical waveguide fibers inserted into a V-shaped groove in the connector and then holding said ends in place by means of an element which continuously pushes them into the groove.

2. Description of the Prior Art

A device of this type is known from German Auslegeschrift No. 23 63 986. In the known structure of this device, the V-shaped groove which accepts the fiber ends is located in a first structural piece which is closed off by the flat surface of a second structural piece, while a third structural piece presses the said first two pieces together continuously. This known type of structure has several disadvantages, some of which are serious.

In the first embodiment of the above device, in which the two half-cylindrical pieces are brought under a cover (one of which two pieces has the V-shaped groove) and are held together by heat shrinking a sleeve of plastic tubing on them, it is difficult to form the connection because in order to do so a plurality of structural parts must be manipulated along with the two fiber ends. Also, in order to release the connection one of the structural pieces must be destroyed, namely the plastic tubing sleeve. Moreover, the connection cannot be visually checked for the proper distance between the end faces of the fibers, either during or after the formation of the connection.

In the second embodiment, in which a plate with parallel V-shaped grooves is acted on by a pressure strip (or beam) which can be moved into the tightened position by means of screws, there is the disadvantage that the compressive forces acting from the two sides in the connection can be different, because for each screw the force depends on the force exerted by the operator in tightening the screw. A consequence of this can be axial i.e., transverse misalignment of the fiber ends. Another undesirable effect is that the fiber ends must be pushed or "threaded" into the V-shaped grooves, so that particles of dirt present there are pushed forward to the location of the connection. Finally, as with the first embodiment the connection cannot be inspected for correctness either during or after its formation.

These objections apply similarly to the remaining embodiments of the above reference. The most serious possible defects in the type of fiber connection sought, namely transverse or "axial" misalignment, excessive separation between the end faces of the fibers, an angle due to a defect or tilting, and/or some kind of contamination of the connecting region, are a result of the aforementioned disadvantages, and cannot be observed visually in the completed connection. Also, the problem of releasing tension on the fibers in the neighborhood of the connection is not adequately solved in the known device.

BRIEF SUMMARY OF THE INVENTION

The underlying object of the invention is to produce a proper, reversible connection of the fiber ends, by technically simple and economical means, the correctness of which connection can be observed visually at any time, i.e. during and particularly after the formation of the connection.

With the known device as a starting point, this objective is achieved according to the invention by the following measures:

1. The path along which the fiber ends are moved when they are inserted into the V-shaped groove is perpendicular to the direction[s] in which the fibers and groove are orientated.
2. The vertex angle of the groove is orientated laterally in such a way that its bisector runs approximately horizontally.
3. the depth of the groove is less than the diameter of the fiber end, so that when the fiber end is being held in place it extends out to the side, out of the groove, and can be observed.
4. There are two holding elements associated with each fiber end. One of these acts in the immediate neighborhood of the end face of the fiber, and the other farther back away from the fiber end.
5. The two holding elements associated with a fiber end are subject to being acted upon by at least one actuating member.

Inserting the fiber ends in a motion transverse to the direction of orientation of the fiber[s] enables one to avoid pushing dirt particles ahead of the end faces of the fibers and forward to the location of the connection; also, with this mode of insertion the fiber ends remain visible during the entire insertion process. Due to the lateral position of the vertex angle of the groove, the final segment of the insertion motion must involve a horizontal movement. In this way, in contrast to mere vertical insertion into a V-groove, any transverse or "axial" misalignment is visible from above, particularly since the depth of the groove is less than the diameter of the fiber. The use of two holding elements spaced at a distance from each other results in always trouble-free fine clamping in the end region of the fiber, plus reliable rough clamping and tension releasing in the region farther back from the end. Finally, the actuation of the two holding elements by a single actuating member ensures that the two clamping processes are thus carried out simultaneously. This does not exclude the possibility of alternatively providing a separate actuating member for each holding element. These actuating members do not need to be mounted on the connecting device itself but may be elements of the mounting means.

As a further refinement of the invention the holding elements may be in the form of two-armed plate springs with one arm in one lateral half of the connecting device and the other arm in the other half, so that the clamping pressure or force is the same on both sides of the connection, for both springs the spring with point of application near the end face of the fiber as well as the spring with point of application farther from the end face. The most important benefit of this very simple structural feature is a reduction in the tendency toward misalignment. Misalignment is produced when there is a difference in the clamping forces or "pressures", whereby the fiber ends are pressed into the V-groove to different depths.

According to another essential feature of the invention, the plate springs are provided with extensions which in the rest position block the groove and the adjoining fiber guide channel, and which extensions can be moved out of the groove and the fiber channel only by actuating the actuating member. Thus, the fiber ends can only be inserted when the holding elements are under tension, (i.e., ready to clamp).

This condition is assisted in that the extensions of the plate springs automatically move into the clamping position under the action of the plate springs, after the fiber ends are inserted and the actuating member is released. Since the operator or control device must release the actuating member at some point in order to carry out the next connecting process, i.e., "in order to proceed to connect another set of fibers", it is possible to arrange the excursions of the springs such that the clamping at the location near the end face of the fiber is either simultaneous with, or consecutive with, i.e., consecutive in the sense of either before or after, the clamping at the location more distant from the end face of the fiber.

BRIEF DESCRIPTION OF THE DRAWINGS

A preferred embodiment of the invention will now be described with reference to the accompanying drawings wherein.

DETAILED DESCRIPTION

Figure 1:
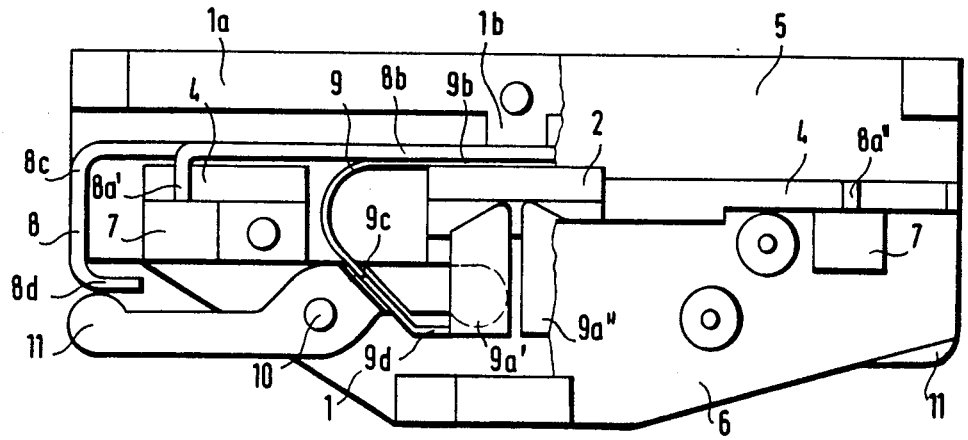
FIG. 1 is a top plan view of a device incorporating the invention in the rest position, without fiber ends inserted.
Figure 2:
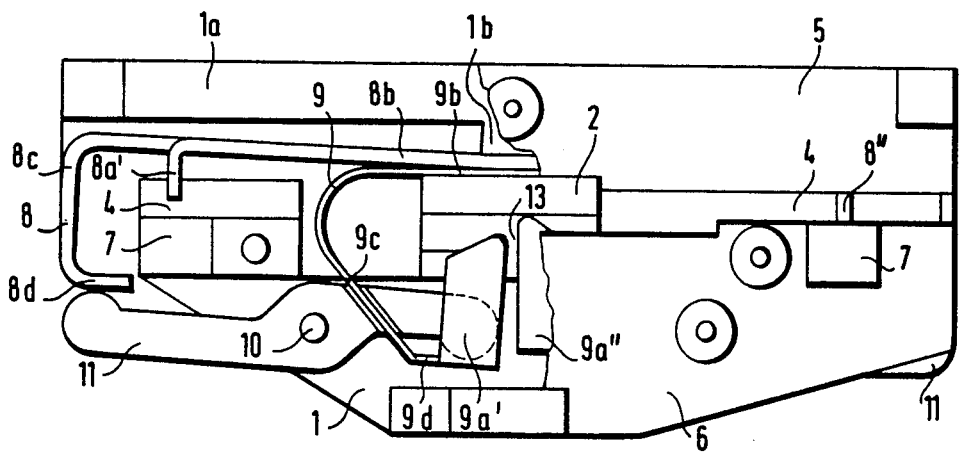
FIG. 2 is a similar view of the device of FIG. 1 in the ready position, immediately prior to insertion of the left fiber end.
Figure 3:
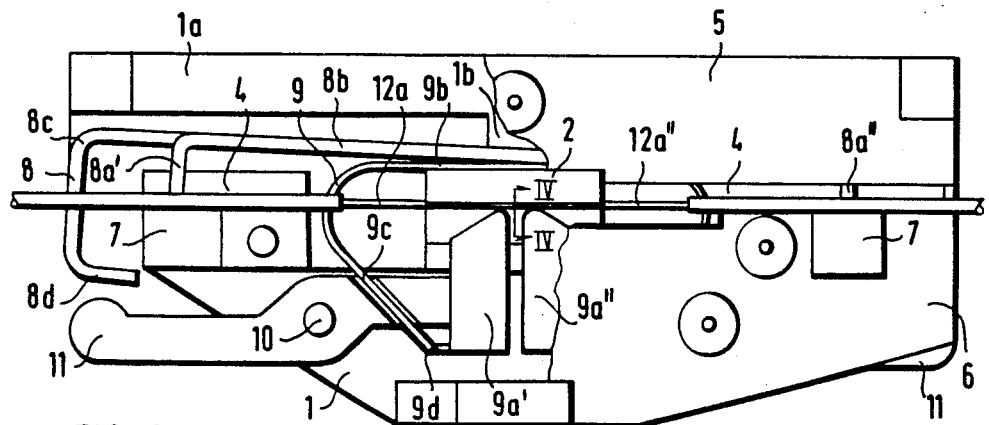
FIG. 3 is a similar view of the device of FIG. 1 in the operating position, with fiber ends on both sides inserted and clamped.

In FIGS. 1 to 3 the left half of the top cover has been omitted as shown by the broken lines in order to make visible the parts lying thereunder. The right half contains the same parts in the same arrangement; thus, there is axial lateral symmetry in the rest position of FIG. 1 and the operating position of FIG. 3.

Figure 4:
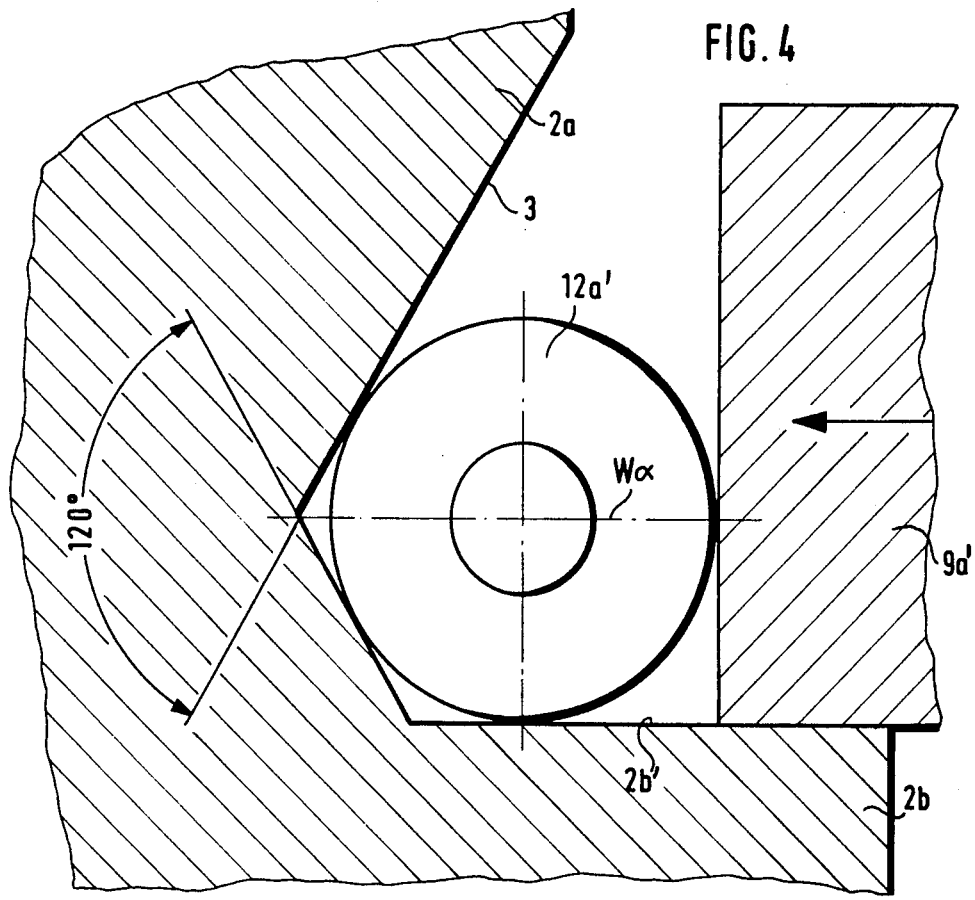
FIG. 4 is an enlarged cross-sectional view of the V-shaped groove of the clevice of FIG. 1, taken along the line IV—IV with a fiber end inserted and clamped.

A connecting piece 2, which extends equally in the right and left halves of the device, is attached to a lower cover 1 in the middle of the latter. The connecting piece 2 is basically a piece having a 90° angle in the vertical leg 2a of which a horizontally running V-shaped groove is cut directly over the angle of said piece (see FIG. 4). The 120° angle of the groove in the exemplary embodiment shown is orientated laterally such that its bisector $W\alpha$ runs horizontally, parallel to the surface 2b' of the horizontal leg 2b.

As can be seen through the right half of the device with the cover on, a channel 4 for the fiber adjoins the groove 3 at the end of the connecting piece 2, and said channel runs in the same direction as the groove 3. This fiber channel 4 is accessible from above (as is the groove 3), since the top cover is comprised of two parts, namely a cantilevered panel 5 and a plate 6, with a gap between them. A thrust member 7 bounds the fiber channel 4 on the side.

In the rest position of FIG. 1, an arm 8a' of a two-armed plate spring 8 rests against this thrust member 7, blocking the fiber channel 4. The plate spring 8 is mounted by means of its base leg 8b onto a prominence 1b on a right angle bend or leg 1a in the bottom cover 1. The base leg 8b has a right angled bend 8c on both sides of the device (only the left bend is visible in the drawings), from which the spring extends through a second right angle bend (return bend) to the free spring end 8d.

The base leg 9b of another two-armed plate spring 9 is held in place between the exterior side of the vertical leg 2a of the connecting piece 2 and the base leg 8b of the plate spring 8. The base leg 9b is bent near the connecting piece 2 in such a way that the bend 9c runs underneath the fiber channel to a position in which the free spring end 9d runs parallel to the groove 3. Adjoint pieces 9a' and 9a", respectively, are attached to the two spring ends 9d; in the rest position of FIG. 1 these adjoint pieces extend out to contact the groove 3, blocking passage through it.

A swingably mounted 10 actuating member 11 in the form of a double lever rests against the spring ends 8d and 9d. Swinging actuating member 11 in the clockwise direction (as viewed at the left in FIG. 1) causes the plate springs 8 and 9 to be deflected by it simultaneously, in the embodiment shown, to bring about the ready position shown in FIG. 2 wherein the groove 3 and the fiber channel 4 are freely accessible.

The operation of the inventive device proceeds as follows:

The operator first puts the device in the rest position of FIG. 1, in which the groove 3 and the fiber channel 4 are blocked by the adjoint pieces 9a' and 9a", and the arms 8a' and 8a". In order to be able to insert the fiber ends 12a', the operator must swing the left (as shown) actuating member 11 clockwise and hold it in the position of FIG. 2, in order for the groove 3 and the fiber channel 4 to be accessible.

Then the fiber end 12a' is moved in from above, by motion transverse to, i.e., vertical to, the direction in which the fiber extends, which motion proceeds in front of and along the vertical leg 2a of the connecting piece 2, until the fiber reaches the horizontal surface 2b' of the horizontal leg 2b of piece 2, and which motion at the same time proceeds downward in the fiber channel 4 between the thrust member 7 and the end face of the arm 8a' of the plate spring 8, whereby the leftward facing side 13 of the adjoint piece 9a" of the plate spring 9 forms a detent and control surface for the fiber end 12a'. In this position the fiber end 12a' is still completely visible.

If the operator now releases the actuating member 11, the plate springs 8 and 9 will automatically tend to return to the rest position of FIG. 1. They cannot return fully, however, because their end parts 8a' and 9a' will encounter and press against the fiber end 12a' in the course of their return motion, so as to press the fiber end against the thrust member 7 (rough clamping and tension releasing), and against and into the groove 3 (fine clamping). Thus, when the actuating member 11 is released, the fiber end 12a' is automatically held in place in the left half of the connector.

Then the fiber end 12a" in the right half of the device is similarly inserted and held in place, resulting in the operation-ready position shown in FIG. 3, which is namely the completed connection. In this position the region in which the two fiber ends 12a' and 12a" face or abut, each other is still partially visible (see FIGS. 3 and 4), so that if necessary it may be determined, with the aid of an optical magnifier, whether there is an axial or transverse, misalignment, excessive separation between the end faces of the fibers, an angle due to a defect or tilting, and/or some kind of contamination of the connecting region. Also, since during the entire period of producing the connection the entire end region of each fiber is visible, damage which occurs during insertion can be detected. The known connecting devices do not have their advantage, since with them the fiber ends are covered during their insertion into the connecting region.

Finally, it is noted that the structure of the device is very elegant and at the same time simple; further it is very compact and comprised of a single unit. Additional means may be provided for operating the actuating member 11, so that the operator need only perform the operation of inserting the fiber ends, followed by checking the correctness of the connection.

We claim:

1. In a connector device for releasably connecting the ends of optical waveguide fibers having an alignment means into which the ends of the fibers are inserted including a V-shaped groove in the connector and clamping means which clamps said ends in place by continuously pressing the ends of the fibers into the groove, the improvement comprising:

an opening for the V-shaped groove through which the fibers are inserted for entry into the groove extending the full length of the groove so that the path of entry for the ends of the fibers during insertion into the groove is perpendicular to the longitudinal direction in which the fibers and groove are orientated;

the vertex angle of the groove is orientated laterally so that its bisector extends approximately perpendicular to said path of entry of the ends of the fiber;

the depth of said groove is less than the diameter of the fiber ends, so that when the fiber ends are in place they extend out of the groove in the direction of said bisector and can be observed;

two clamping elements for each fiber end operatively mounted on the connector device for releasably clamping a respective fiber end, one of said clamping elements being located adjacent the end face of the respective fiber and the other clamping element being spaced at a distance remote from the fiber end; and at least one actuating member operatively associated with said two clamping elements for each fiber end for actuating said two clamping elements between clamping and non-clamping positions.

2. A device according to claim 1 wherein the vertex angle of said V-shaped groove is 120°.

3. A device according to claim 1 wherein the depth of said V-shaped groove is greater than the radius of said fiber ends.

4. A device according to claim 1 wherein said clamping elements comprise double-arm plate springs each having one arm disposed in one half of the connector device and the other arm disposed in the other half, so that the clamping force is the same on both sides of the connection for each respective spring.

5. A device according to claim 4 and further comprising a fiber guide channel extending colinearly with respect to said V-shaped groove on each opposite side thereof to receive said fiber ends therein, and respective extensions on said plate springs which extend into the groove and fiber guide channels in the clamping position to block said groove and said fiber guide channels.

6. A device according to claim 5 wherein said at least one actuating member for actuating the two clamping elements for each fiber end comprises a lever which when actuated moves said extensions of the plate springs out of the groove and said fiber guide channel.

7. A device according to claim 6 wherein said extensions of the plate springs automatically move into the clamping position under the action of the plate springs when the fiber ends are inserted and the actuating member is released.

8. A device according to claim 7, wherein said springs are designed so that the excursions thereof control the sequential timing of the clamping of each respective spring relative to the other.

9. A device according to claim 8 wherein said spring extension which blocks said V-shaped groove in one half of the connector device forms a guide stop surface for the end of the fiber which is disposed in said other half of said device.

* * * * *